No. 31,121.

W. HOLMES
WINDMILL.

PATENTED JAN. 15, 1861.

Attest:
J. W. Coomly
R. S. Spencer

Inventor:
Willis Holmes
per Munn & Co. Attn.

UNITED STATES PATENT OFFICE.

WILLIS HOLMES, OF MACOMB, ILLINOIS.

WINDMILL.

Specification of Letters Patent No. 31,121, dated January 15, 1861.

*To all whom it may concern:*

Be it known that I, WILLIS HOLMES, of Macomb, in the county of McDonough and State of Illinois, have invented a new and useful Improvement in Windmills; and I do hereby declare that the following is a full, clear, and exact description thereof, reference being had to the accompanying drawings, making a part of this specification, in which—

Figure 1:
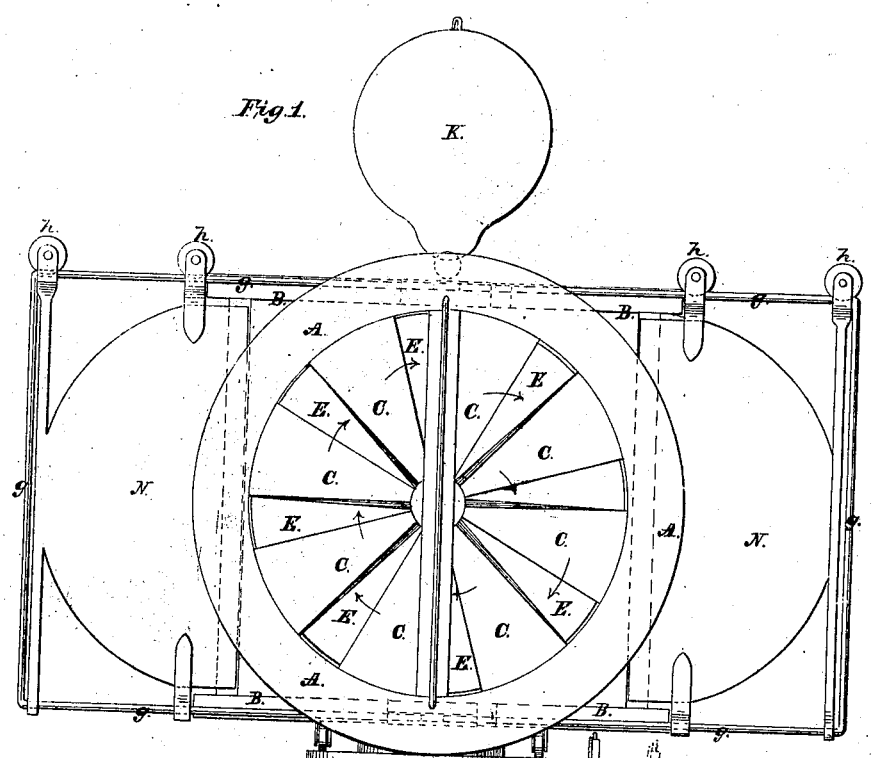
Figure 2:
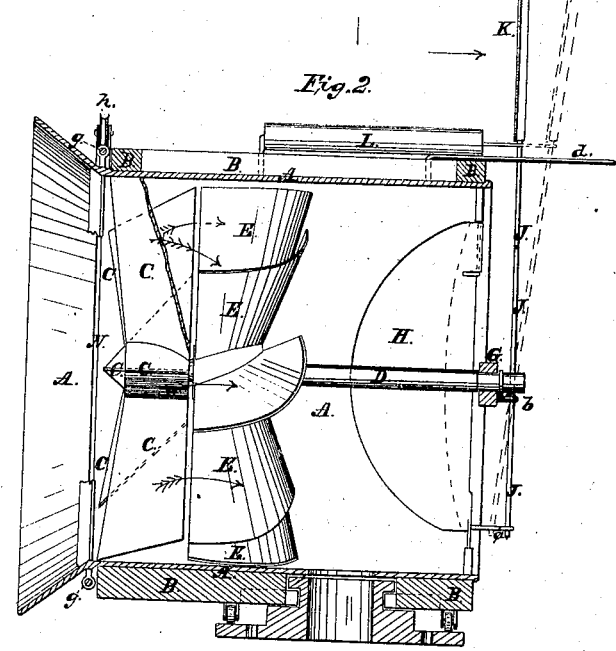

Figure 1, is a front view of the improved mill. Fig. 2, is a longitudinal diametrical section through the casing of the mill of Fig. 1.

Similar letters of reference indicate corresponding parts in both figures.

To enable those skilled in the art to fully understand my invention I will proceed to describe its construction and operation.

A, is a cylindrical flume of a suitable length and diameter which has a flaring mouth. This flume is secured to a framework B, and the whole are so mounted that the flume will rotate horizontally to accommodate the direction of the wind and always present the broad end to receive the current of air.

In the front end of the flume—that is the wide end—are arranged a number of stationary conducting wings C, C, which are slightly curved; and their broad surfaces are placed at a suitable angle with the horizontal wind shaft D, to direct the currents of air against the fans or wings of a revolving turbine wheel E, which is on the windshaft D, and as these currents impinge on all the surfaces of wheel E, which surfaces are curved and arranged at opposite angles to the conducting wings C, C, as shown in Fig. 2, this turbine is caused to rotate with a fast or slow motion according to the velocity of the current of air. The wings or fans of the turbine are curved in such a manner that the currents of air directed upon them by the stationary wings C, C, will operate to the best advantage, to turn the wheel. The shaft D, of the turbine has its bearings in the hub of stationary wings C, and in the middle of a cross bar G, extending diametrically across the back end of the flume A, as shown in Fig. 2 of the drawings, the axis of this shaft D, is the axis of the flume A, and it may have a bell crank on it to which a connecting rod communicating with the piston of a pump may be attached, if the mill is used for pumping water.

To regulate the motion of the turbine E, I have arranged two wings or valves H, H, in the back end of the flume A, which are of semicircular shape. These are pivoted at the top and bottom of the flume so that they may be operated to partially open and partially close the end of the flume.

*a, a*, are two bent arms with eyes formed in their ends; and J, J, are two forked rods which carry on their upper ends a fan K. These rods rest on eyes *b, b*, which project from each side of the center of cross bar G, which points are the fulcra of the rods J. The ends of these rods pass through the eyes on the ends of arms *a, a*.

*d*, is a bent rod which serves as a guide for the arms J, and L, is a box inclosing a spring one end of which is attached to the rods J, all as represented in Fig. 2.

Now it will be seen from this description that when the wind is very strong the fan K, will be forced back as represented in red lines Fig. 2, and the valves H, H, will spread out and partially close the end of the flume A. When the wind moderates the spring in box L, will return the fan and consequently the valves to their original position. These valves by this arrangement are made to operate automatically and to retard the currents of air through the flume in proportion as the velocity of the wind increases.

The front or flaring end of the flume A, is provided with two sliding gates N, N, which are supported in a frame work *g, g*, and are capable of sliding together, behind the flaring mouth of the flume so as to entirely close up this end of the flume and thus stop the motion of the wheel E, or the gates may be moved back so as to have the end of the flume entirely open. These gates N, N, are hung on rollers *h, h*, which allow them to be moved with facility. These gates are to be operated by means of a float which is suspended from the mill, and floats on the surface of the water. If the mill be used for pumping water the cord or lever to which the float is hung is so arranged in relation to the gates N, N, that when the water gets too low for the pump to operate, the gates will be closed and the mill will stop. Then when the water elevates the float again the gates will be opened and the pump will be again set in motion. Neither the float, nor the manner of operating the gates, are shown in the drawings.

Having thus described my invention, what I claim as new and desire to secure by Letters Patent, is—

The arrangement of the self acting fan K and valves H, H with the flume A, bar G, rods J J, spring box L and wheel E in the manner and for the purposes herein shown and described.

WILLIS HOLMES.

Witnesses:
WILLIAM H. FRANKLIN,
WILLIAM SNODGRASS.